United States Patent [19]

Walton

[11] Patent Number: 5,331,769
[45] Date of Patent: Jul. 26, 1994

[54] GRINDING APPARATUS AND METHOD
[75] Inventor: Barry Walton, Rotherham, England
[73] Assignee: Black & Decker Inc., Newark, Del.
[21] Appl. No.: 192,191
[22] Filed: Feb. 4, 1994

Related U.S. Application Data

[63] Continuation of Ser. No. 959,191, Oct. 9, 1992, abandoned.

[30] Foreign Application Priority Data

Oct. 10, 1991 [GB] United Kingdom ............... 9121534.3

[51] Int. Cl.$^5$ ............................................. B24B 5/00
[52] U.S. Cl. .................. 51/105 SP; 51/266
[58] Field of Search ................. 51/266, 270, 323, 424, 51/425, 105 R, 105 SP

[56] References Cited

U.S. PATENT DOCUMENTS

| | | | |
|---|---|---|---|
| 2,622,699 | 11/1950 | Mills . | |
| 4,120,121 | 10/1978 | Surman | 51/270 |
| 4,186,529 | 2/1980 | Huffmann . | |
| 4,387,286 | 6/1983 | Inoue | 219/690 |
| 4,646,485 | 3/1987 | Ashworth | 51/425 |
| 4,665,656 | 5/1987 | Yang | 51/270 |
| 5,071,541 | 12/1991 | Thompson | 51/425 |
| 5,150,727 | 9/1992 | D'Amato | 51/424 |

FOREIGN PATENT DOCUMENTS 0134306  9/1953  Fed. Rep. of Germany .
2479059  3/1981  France .

OTHER PUBLICATIONS

Abstract (English Translation) published 30 Apr. 1982 of Japanese Patent Application 57-8073.
Abstract (English Translation) published 26 Jan. 1989 of Japanese Patent Application 63-245350.

*Primary Examiner*—M. Rachuba
*Attorney, Agent, or Firm*—Charles E. Yocum; Dennis A. Dearing; Edward D. C. Bartlett

[57] ABSTRACT

Grinding apparatus including a grinding disc for grinding a tool having tungsten carbide tips is disclosed, and a recirculating coolant system is provided with a magnetic separator for removing particles of tungsten carbide from the recirculating coolant. The magnetic separator includes an elongated, labyrinthine flowpath through which the coolant flows while the tungsten particles are separated from the coolant by a magnetic field.

15 Claims, 1 Drawing Sheet

GRINDING APPARATUS AND METHOD

This is a continuation of U.S. application Ser. No. 07/959,191, filed Oct. 9, 1992 now abandoned.

FIELD OF THE INVENTION

This invention relates to apparatus for grinding tungsten carbide tips of machine and other tools and particularly to apparatus for magnetically separating tungsten carbide particles from a method of filtering the coolant employed in such apparatus.

BACKGROUND OF THE INVENTION

In the manufacture of saw blades, for example, tungsten carbide tips are fixed by any suitable means (such as brazing) around the periphery of the blade to form the teeth thereon. While the tips will be supplied to the blade manufacturer with the appropriate shape within reasonable tolerances for the cutting operations they are eventually to perform, a final grinding operation is always required on them to ensure they are sharp and have the more accurate tolerances required in the final product.

The final grinding operation may be conducted in one or two stages depending on the particular saw blade being made and this is achieved in a grinding apparatus comprising means to hold the blade in a number of different angular positions to bring each tip in turn into proximity with one or more grinding wheels disposed in the apparatus and adapted to be moved across each tip to grind it in a particular plane. The grinding wheel is rotated by the apparatus to perform the grinding operation and comprises a hard composite material containing industrial diamond particles capable of grinding and removing material from the tungsten carbide tip.

In the process, the feed rates and relative speeds involved between the tip and the grinding wheel generate considerable frictional heat, not to mention very fine tungsten carbide dust. Thus a coolant is arranged to wash each tip as it is ground and the coolant comprises water and various known additives to assist the grinding process. Not least of these additives is a rust inhibitor to nullify the corrosive properties of water.

Environmental considerations alone would discourage disposal of the coolant after use, but in any event the cost of the various additives employed would prohibit employing fresh coolant on a continuous basis. Thus each grinding apparatus further comprises a coolant sump into which used coolant drains and from which a pump collects the stored coolant for recycling to the grinding region of the apparatus.

The tungsten carbide dust generated during the grinding process is of course largely entrained and held in suspension in the coolant and because it is so fine it has no opportunity to settle out in any quantity in the sump before it is recycled with the coolant. Thus after only a matter of hours after a fresh charge of coolant is introduced to the grinding apparatus, the coolant becomes heavily contaminated with primarily tungsten carbide dust. Of course, dust is also generated from wear of the grinding wheel, but this accounts for less than 10% of the total dust generated.

This contamination leads to further problems. One problem is an environmental one in that some of the coolant at the point of grinding gets converted into a spray which enters and carries into the atmosphere the entrained dust. Thus in some jurisdictions, it is a requirement in such grinding apparatus to provide a screen and vacuum extraction apparatus in the grinding region to remove contaminated air from the region and away from the potential surroundings of the grinding apparatus operators. The need for this would be considerably reduced if clean coolant was employed all the time. A further problem is simply the contamination of the apparatus, and particularly its moving parts, with a fine, very hard dust which significantly reduces the working life of the apparatus.

It has, of course, long been appreciated the benefits which would accrue from employing clean solution, and an obvious answer is to filter the coolant before it is recycled. However the average size of particles suspended in the coolant is of the order of one micron and this necessitates the use of disposable ceramic filters and a pressure system to force the coolant through the filter. Such an arrangement is prohibitively expensive.

Another solution is to provide a large central coolant reservoir serving a multitude of grinding machines and into which the sump of each machine drains and from which fresh solution is drawn. The hope is that, given sufficient time and sufficiently still conditions, at least the larger heavier particles will have settled out of suspension before the coolant is reemployed. However, it is the small light particles which are particularly responsible for the problems outlined above, because it is they which get carried into the vapour spray and which tend to drift towards operators and deposit themselves in unwanted places. It is unlikely that the central reservoir can be rendered sufficiently large, given economic constraints, to ensure settling out of these small particles. Besides which, smaller particles may be held as a colloid rather than in suspension and in which case will never settle out.

SUMMARY OF THE INVENTION

Thus it is an object of the present invention, to provide a grinding apparatus which does not suffer from the afore-mentioned problems or which at least mitigates their effects.

The solution proposed by the present invention stems from the realisation that the commonly held view that tungsten carbide is not ferromagnetic, or at least not influenced by a magnetic field in the form in which it is employed in tool bit tips, is not entirely true and that, given sufficiently small particles and sufficiently still conditions, tungsten carbide will be attracted to the poles of a sufficiently strong magnet.

Thus in accordance with the present invention, there is provided grinding apparatus comprising means for clamping a tool having a tungsten carbide tip to be ground by the apparatus, a rotatable grinding wheel adapted to grind said tip, coolant washing means adapted to direct coolant over the tip and wheel during grinding, coolant collection means to collect used coolant and entrained tungsten carbide particulate products generated during grinding and to deposit said coolant and entrained particles in the inlet of a separation channel, said channel having an outlet at a distance from said inlet and draining into a sump from which coolant is drawn by said washing means, said channel being arranged at a slight inclination such that coolant trickles from inlet to outlet, a surface of said channel being magnetised, whereby said entrained particles are attracted by the magnetic field generated by said magnetised surface and are retained on said surface. The coolant exiting said outlet preferably has less than 50% and ideally less than 90%, the tungsten carbide particulate content as coolant entering the inlet.

It will of course be appreciated that the efficiency of the separation channel can be improved by various means. For example by increasing its length, which basically has the effect of increasing the residence time of coolant in the separation channel and therefore increases the probability of the particulate matter settling out under the influence of the magnetic field and being retained in the channel. Similarly, increasing the strength of the magnetic field has the same effect. The residence time of the coolant in the channel can also be increased simply by deepening the channel by, for example, having only a slight inclination of the channel from inlet to outlet of, say, less than five degrees from the horizontal and providing a weir at the outlet. However, care must be taken not to allow coolant, by virtue of deepening the channel for example, to be so far removed from the magnetic field that the strength of the field is not sufficient to draw the weakly attracted tungsten carbide particles onto said surface before the coolant spills over the weir.

Preferably means are provided enabling the channel to be cleared from time to time of the sludge of particulate matter which gathers on said surface.

It will be appreciated that many configurations of the separation channel within the ambit of the present invention are feasible, but a particularly preferred arrangement is a separation channel comprising a floor plate inclined from an inlet end to an outlet end thereof at an angle of less than ten degrees, and preferably at about five degrees, to the horizontal, and a labyrinth supported on said floor plate and comprising side containing walls having inwardly directed, interleaving walls disposed across the slope of said floor to define a labyrinthine path, said outlet comprising a weir formed in the side wall at the end of said path at the outlet end of the floor plate, a permanent magnet being disposed beneath said floor plate.

Preferably said floor plate is itself ferromagnetic. Preferably said labyrinth is not ferromagnetic and is not permanently fixed to said floor plate whereby said means enabling the channel to be cleared from time to time simply comprises lifting said labyrinth to leave the sludge on the plate from which it is easily cleared with a scraper or the like.

BRIEF DESCRIPTION OF THE DRAWINGS

The invention is further described hereinafter, by way of example only, with reference to the accompanying drawings, in which.

DETAILED DESCRIPTION OF THE PREFERRED EMBODIMENTS

Figure 1:
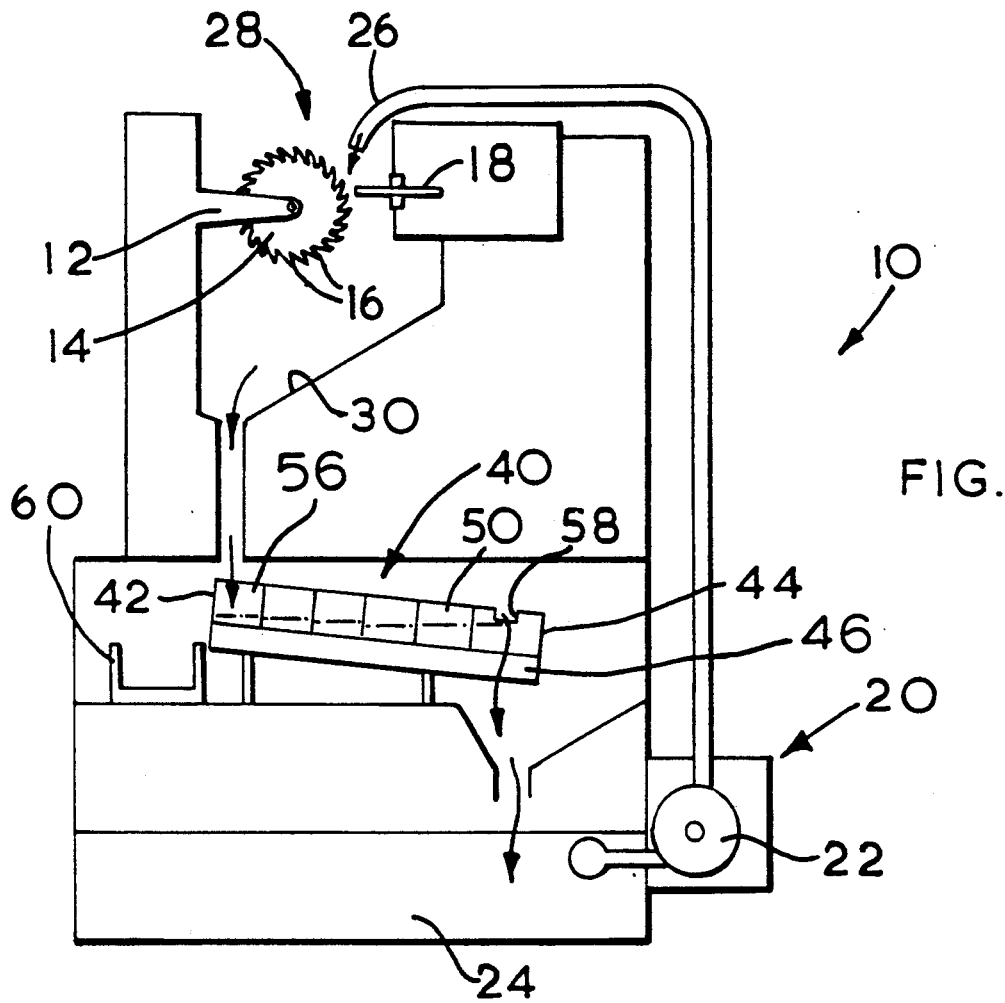
FIG. 1 is a schematic side view of a grinding apparatus according to the invention.

In the drawings, a grinding apparatus 10 comprises an arm 12 to hold firmly in different angular positions a saw blade 14 having teeth 16 consisting of tungsten carbide tips or inserts brazed or otherwise fixed in shaped notches in the edge of the disc forming the blade 14.

The blade 14 is rotatable in the arm 12 to bring each tooth 16 in turn into position adjacent a grinding disc 18 rotationally mounted in the apparatus 10. The disc 18 is rotated at speed and, in a manner well known in the art, is moved through a grinding stroke past each tooth 16 to effect a grinding operation thereon. That operation may be on the outside edge of the tooth or on the side edges. However, none of this is the subject of the invention as it is quite conventional and can be changed without affecting the operation of the invention. For example, different surfaces of the teeth 16 could be ground, or indeed a different tool, such as a planer cutting blade edge or the like, might be employed.

In any event, to cool the tip and grinding wheel as the grinding operation is performed, coolant washing means 20 are provided comprising a pump 22 drawing coolant from a sump 24 and pouring it through a hose 26 over the disc 18 and blade 14 where they meet in a grinding region 28 of the apparatus 10.

After performing its cooling, lubricating, washing function, most of the coolant finds its way to a funnel-like coolant collection means 30, but a small proportion is sprayed and misted by the heat and movement pertaining in the grinding region 28. If the coolant is clean when it washes the grinding region, then the spray generated is not so much of a problem, because then the contamination by entrained particles is not at a high level. If, however, the coolant collected in funnel 30 is merely returned directly to sump 24 for recycling, it soon becomes heavily contaminated with particles and in which case the spray likewise is heavily contaminated and this causes numerous problems as described earlier.

Thus the present invention provides a separation channel 40, into an inlet end 42 of which the coolant collected in funnel 30 drains. Only after passing along the channel 40 does the coolant exit from an outlet end 44 of the channel 40 and find its way into sump 24.

Figure 2:
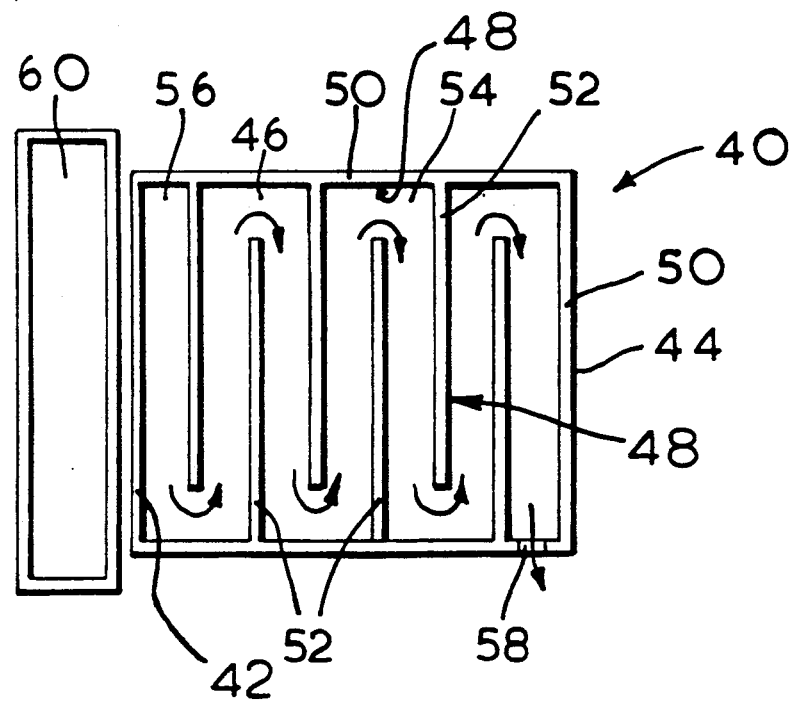
FIG. 2 is a plan view of the separation channel of the apparatus of FIG. 1.

FIG. 2 shows a plan view of the channel 40 which comprises a floor plate 46 and labyrinth 48 consisting of containing side walls 50 and interleaving walls 52, which between them define a labyrinthine path 54.

The floor plate 46 is inclined downwardly from inlet end 42 to outlet end 44 at an angle of about five degrees to the horizontal. The funnel collection means 30 opens above a first blind end 56 of the path 54 at the inlet end 42 of the channel 40. Thus coolant dropping into the inlet 56 trickles down the path 46 until it reaches an outlet 58 formed in the side wall 50 at the other blind end 58 of the path 54. The outlet 58 is in the form of a weir so that at this end of the channel the coolant will be moving more slowly than at the other end.

The floor plate 46 comprises a magnet, or indeed a collection of smaller magnets arranged in an array inside a containing box forming said plate 46.

Tungsten carbide is faintly magnetic, contrary to popular conceptions which treat it as a non-magnetic substance for all material purposes. With particles as fine as are generated in normal grinding operations (of the order of one micron diameter) and with a labyrinth path 46 of about 1.5 meters long over an area of about one square meter and with an average depth along the path of about 20 mm giving a total volume of coolant in the channel 40 of about 600 ml and with a flow rate of about half of one liter per minute, we have found that with a magnet having a magnetic induction of 3900 Gauss that more than 90% of particles of tungsten carbide in the coolant entering the inlet 56 are absent from the coolant overflowing the weir at the outlet 58.

After a period of some time of continuous operation and repeated grinding of successive teeth on successive blades 14, a sludge of tungsten carbide forms on the floor plate 46. If the labyrinth 50 merely seats on the plate 46 and is not itself magnetic (or indeed of ferromagnetic material so that it becomes magnetised) then it can be removed from time to time so that the sludge can simply be scraped off the plate 46 into a receptacle 60 provided for this purpose.

The sludge has significant scrap value and thus is collected for optional drying and resale.

What is claimed is:

1. Grinding apparatus comprising:
   clamping means for clamping a tool, said tool having at least one tungsten carbide tip to be ground by the grinding apparatus;
   a rotatable grinding wheel for grinding said tungsten carbide tip and thereby producing fine tungsten carbide particles;
   coolant circulating means for directing liquid coolant over said tungsten carbide tip during grinding, said coolant circulating means including a sump and pump means for recirculating coolant from said sump over said tungsten carbide tip;
   separation means for separating said tungsten carbide particles from said recirculating coolant as said coolant and particles flow through said separation means;
   said separation means comprising elongated flow channel means having a bottom plate and a pair of side walls, said elongated flow channel means having inlet and outlet portions spaced apart along the elongated length of said elongated flow channel means;
   said separation means further including flow directing walls extending transverse to said side walls and extending into said elongated flow channel means between said inlet and outlet portions, said transverse flow directing walls forming a labyrinthine flowpath through said elongated flow channel means between said inlet and outlet portions; and
   at least one magnetic means for magnetizing said bottom plate of said elongated flow channel means with a sufficient magnetic field to attract and hold a substantial portion of said tungsten carbide particles as said particles flow through said labyrinthine flowpath.

2. The grinding apparatus of claim 1 in which said flow directing walls forming said labyrinthine flowpath are composed of nonferromagnetic material.

3. The grinding apparatus of claim 1 in which said flow directing walls forming said labyrinthine flowpath are supported on, but are separable from and not secured to, said bottom plate whereby said flow directing walls are readily removable from said bottom plate during cleaning of said bottom plate.

4. Tool grinding apparatus comprising:
   grinding means for grinding cutting tools, said cutting tools being comprised of a first material and having cutting portions being composed of a second material such that fine particles of said second material are produced during grinding of said tool cutting portions,
   liquid coolant recirculating means for recirculating coolant over said tool cutting portions such that said fine particles become entrained in said coolant,
   separator means for separating said fine particles from said recirculating coolant as said coolant and entrained particles pass through said separator means, said separator means including means forming a flow channel having an inlet and an outlet and flow-directing wall means forming a labyrinthine flowpath within said flow channel between said inlet and said outlet, and
   magnetic means positioned along said labyrinthine flowpath, said magnetic means being of sufficient magnetic strength to attract and hold a substantial portion of said fine particles as said coolant flows through said labyrinthine flowpath within said flow channel.

5. The tool grinding apparatus of claim 4 wherein said separator means include a bottom surface and a pair of side walls, and said flow-directing wall means extend into said flow channel at an angle with respect to said side walls.

6. The tool grinding apparatus of claim 5 wherein said angle is substantially a right angle.

7. The tool grinding apparatus of claim 5 wherein said flow-directing wall means forming said labyrinthine flowpath are supported on nd readily removable from said bottom surface.

8. The tool grinding apparatus of claim 4 wherein said tool grinding apparatus further includes means for holding said cutting tools in different angular positions relative to said grinding means.

9. The tool grinding apparatus of claim 4 wherein said tool cutting portions comprise cutting tips composed of tungsten carbide.

10. In combination:
    grinding apparatus including a clamp for clamping a tool, said tool having at least one portion composed of tungsten carbide,
    said grinding apparatus further including a grinding wheel positioned to grind said tungsten carbide portion and produce ground particles of tungsten carbide,
    a recirculating coolant system for recirculating liquid coolant over said tungsten carbide portion during grinding such that said ground particles of tungsten carbide become entrained in said recirculating coolant,
    a particle/coolant separator, said separator including an inlet positioned to receive coolant entrained with said particles, said separator further including a bottom, side walls and flow-directing walls, said flow-directing walls being positioned to form a labyrinthine flowpath for ground particles and coolant flowing through said separator, and
    at least one magnet positioned along said labyrinthine flowpath of sufficient magnetic strength to magnetically attract and hold a substantial portion of said ground particles as said particles and coolant pass through said labyrinthine flowpath.

11. The grinding apparatus of claim 10 wherein said flow-directing walls extend across said bottom and extend at angles to said side walls.

12. The grinding apparatus of claim 10 wherein said flow-directing walls are composed of non-ferromagnetic material such that said ground particles are not magnetically attracted to said flow-directing walls.

13. The grinding apparatus of claim 12 wherein said flow-directing walls are supported on and readily removable from said bottom.

14. The grinding apparatus of claim 10 wherein said tool comprises a saw blade and said at least one portion comprises a cutting tip secured to said blade and composed of tungsten carbide.

15. The grinding apparatus of claim 10 wherein said flow-directing walls extend from said side walls into said flowpath, said flow-directing walls being supported on and readily removable from said bottom, and said flow-directing walls being composed of non-ferromagnetic material.

* * * * *